(12) United States Patent
Blazer et al.

(10) Patent No.: US 12,719,260 B2
(45) Date of Patent: Aug. 25, 2026

(54) CURRENT TRANSFORMER SENSING WITH SATURATION PROTECTION

(71) Applicant: Hamilton Sundstrand Corporation, Charlotte, NC (US)

(72) Inventors: Christopher Blazer, Machesney Park, IL (US); Brian Ross, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 190 days.

(21) Appl. No.: 18/746,745

(22) Filed: Jun. 18, 2024

(65) Prior Publication Data

US 2025/0385510 A1 Dec. 18, 2025

(51) Int. Cl.
*H02H 3/28* (2006.01)
*H02H 9/00* (2006.01)
*H02H 9/04* (2006.01)

(52) U.S. Cl.
CPC ........... *H02H 3/283* (2013.01); *H02H 9/005* (2013.01); *H02H 9/042* (2013.01)

(58) Field of Classification Search
CPC ......... H02H 3/283; H02H 9/005; H02H 9/042
See application file for complete search history.

(56) References Cited

U.S. PATENT DOCUMENTS

2013/0193879 A1 8/2013 Sadwick et al.
2014/0327992 A1* 11/2014 Sykes .................... H02H 7/222 361/56
2014/0334047 A1* 11/2014 Ahn ....................... H02H 9/041 361/56
2020/0161045 A1* 5/2020 Miller ................... H01F 27/427
2022/0360072 A1 11/2022 Simonnet et al.
2022/0368127 A1 11/2022 Chin et al.
2023/0307901 A1* 9/2023 Li ........................... H02H 3/08

* cited by examiner

*Primary Examiner* — Daniel Cavallari

(57) ABSTRACT

An apparatus includes a transient voltage suppression (TVS) device configured to be coupled in parallel with a burden resistor. The apparatus also includes a switch configured to couple the TVS device across the burden resistor. The apparatus further includes a comparator configured to detect a peak output voltage provided by a circuit, determine whether the peak output voltage meets or exceeds a threshold, and control the switch based on whether the peak output voltage meets or exceeds the threshold.

20 Claims, 3 Drawing Sheets

CURRENT TRANSFORMER SENSING WITH SATURATION PROTECTION

TECHNICAL FIELD

This disclosure relates generally to electrical circuits. More specifically, this disclosure relates to current transformer sensing with saturation protection.

BACKGROUND

A current transformer is used to produce a replica of a primary current waveform, where the replica can have a lower magnitude based on the ratio of the primary and secondary turns of the current transformer. Current transformers have a range of applications and are typically very accurate unless the current transformers saturate during operation. Saturation of a current transformer occurs when the voltage across the current transformer reaches a specified point such that the flux within the current transformer does not change in proportion to changes in the primary current.

SUMMARY

This disclosure relates to current transformer sensing with saturation protection.

In some examples, an apparatus includes a transient voltage suppression (TVS) device configured to be coupled in parallel with a burden resistor. The apparatus also includes a switch configured to couple the TVS device across the burden resistor. The apparatus further includes a comparator configured to detect a peak output voltage provided by a circuit, determine whether the peak output voltage meets or exceeds a threshold, and control the switch based on whether the peak output voltage meets or exceeds the threshold.

In other examples, a system includes a current transformer and a burden resistor coupled to the current transformer. The system also includes a TVS device configured to be coupled in parallel with the burden resistor and a switch configured to couple the TVS device across the burden resistor. The system further includes a comparator configured to detect a peak output voltage provided by the current transformer, determine whether the peak output voltage meets or exceeds a threshold, and control the switch based on whether the peak output voltage meets or exceeds the threshold.

In still other examples, a method includes detecting a peak output voltage provided by a circuit and determining whether the peak output voltage meets or exceeds a threshold using a comparator. The method also includes controlling a switch that selectively couples a TVS device across a burden resistor based on whether the peak output voltage meets or exceeds the threshold.

Any single one or any combination of the following features may be used with the examples above. The switch may disconnect the TVS device from the burden resistor in response to the peak output voltage being less than the threshold, which may prevent the TVS device from affecting a measurement accuracy of the burden resistor. A differential sense circuit may be coupled across the burden resistor and may provide the peak output voltage to the comparator. The differential sense circuit may include a voltage source; a first operational amplifier coupled in parallel with the voltage source, a first resistor, and a first capacitor; and a second operational amplifier coupled in parallel with the voltage source, a second resistor, a second capacitor, and a third capacitor. The TVS device may limit voltage across the burden resistor in response to the switch being closed. The switch may have a lower leakage current than the TVS device. The threshold may be based on a reference voltage.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
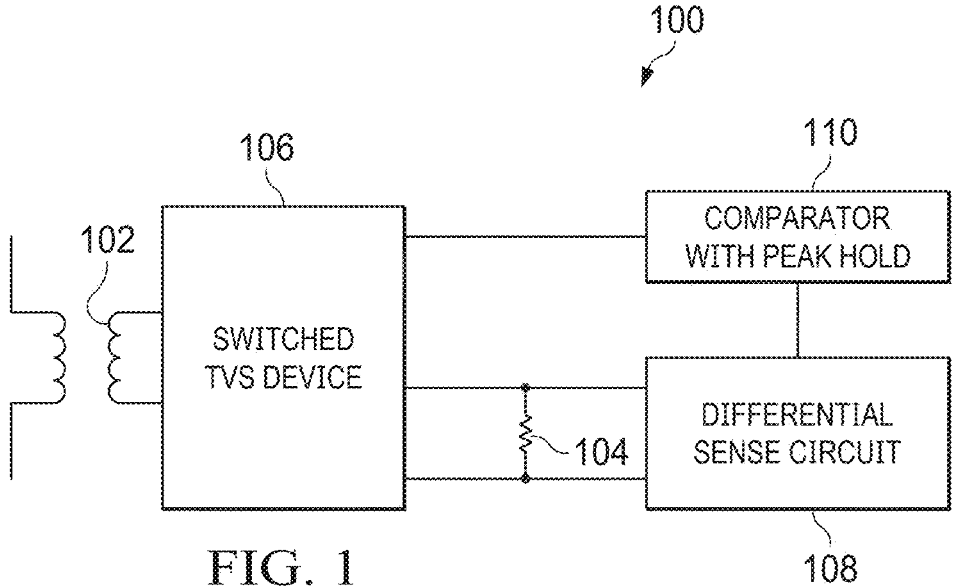
FIG. 1 illustrates an example system supporting current transformer sensing with saturation protection according to this disclosure.
Figure 2:
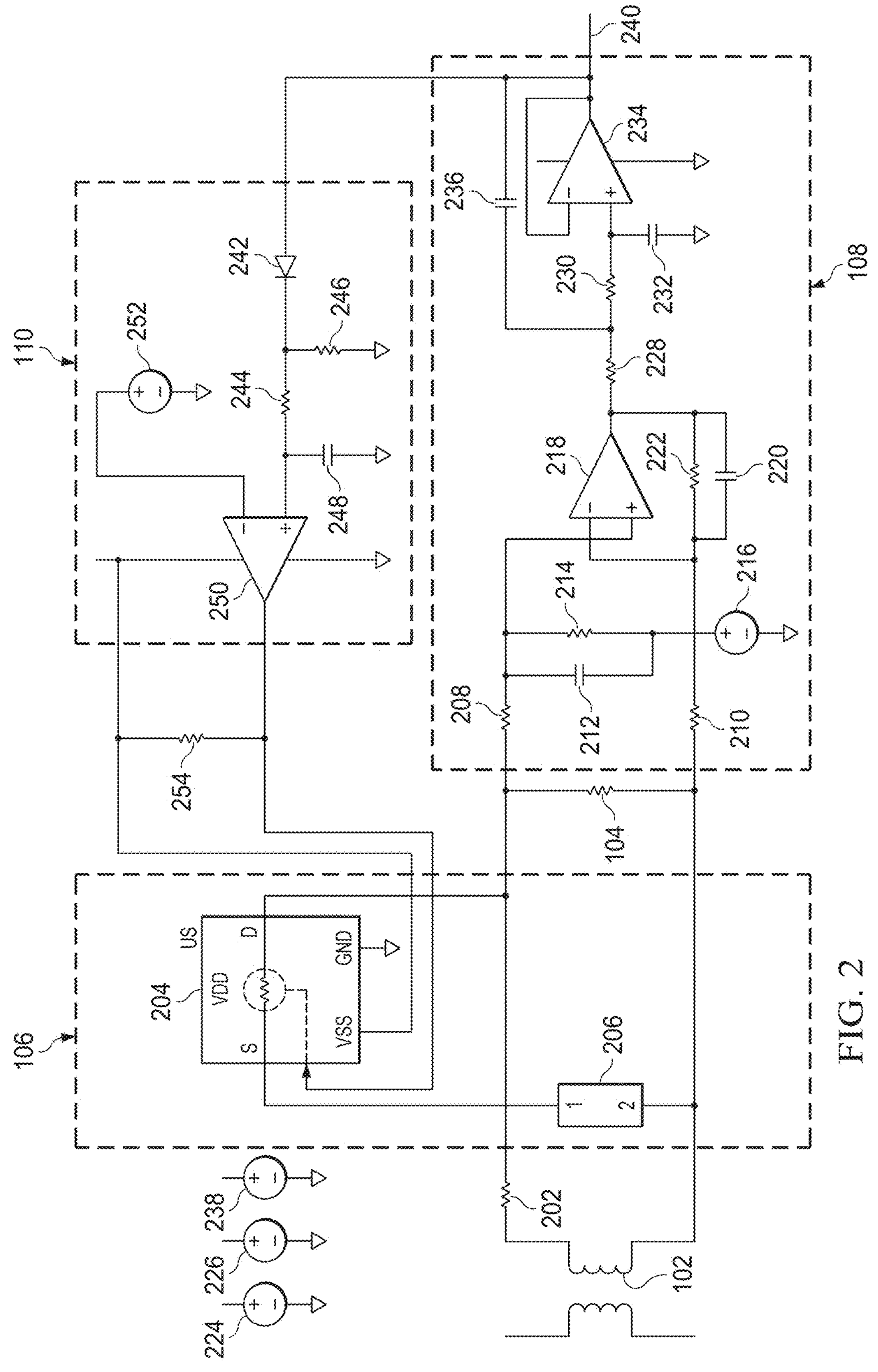
FIG. 2 illustrates a more specific example system supporting current transformer sensing with saturation protection according to this disclosure.
Figure 3:
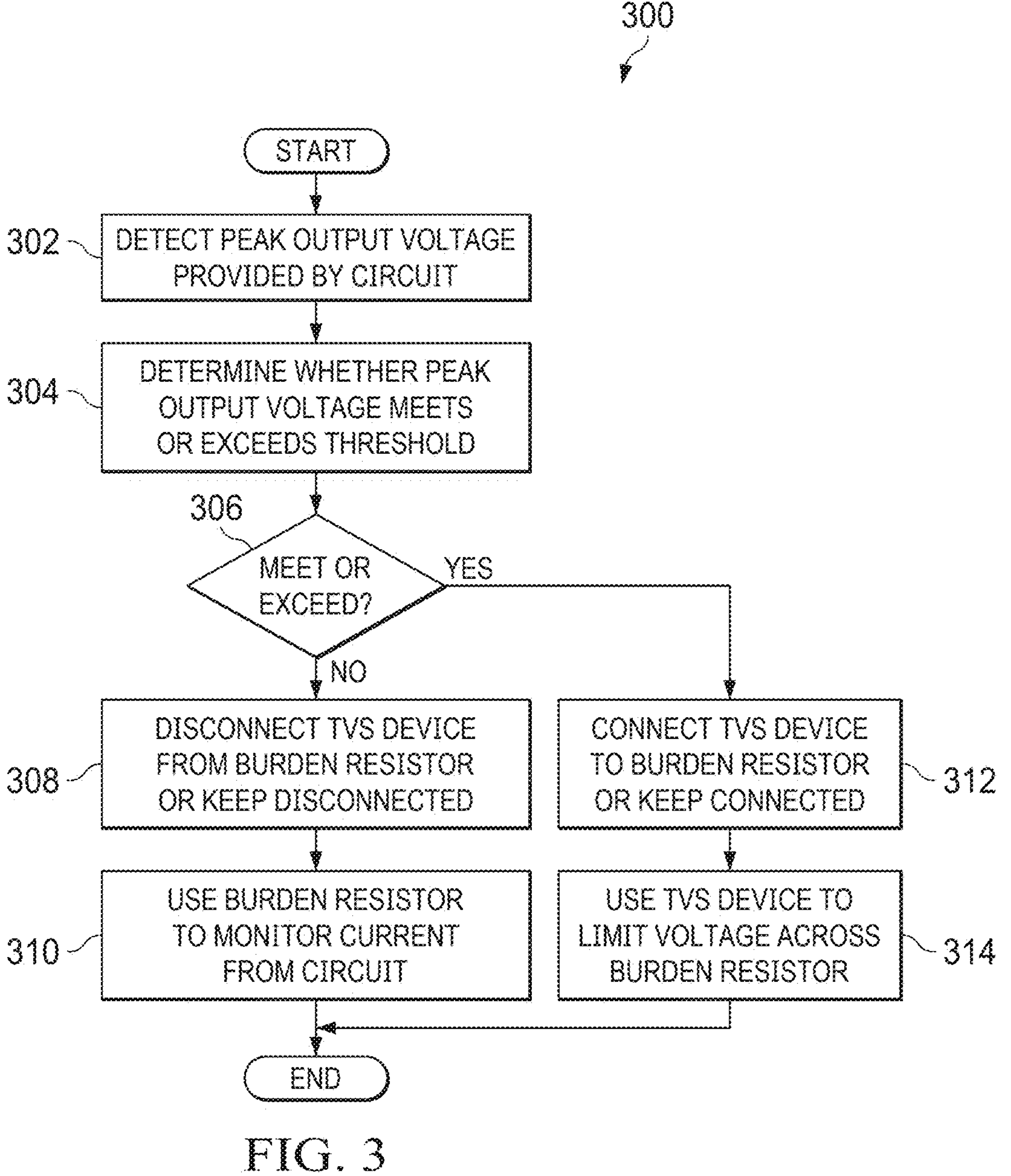
FIG. 3 illustrates an example method for current transformer sensing with saturation protection according to this disclosure.

FIGS. 1 through 3, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, a current transformer is used to produce a replica of a primary current waveform, where the replica can have a lower magnitude based on the ratio of the primary and secondary turns of the current transformer. Current transformers have a range of applications and are typically very accurate unless the current transformers saturate during operation. Saturation of a current transformer occurs when the voltage across the current transformer reaches a specified point such that the flux within the current transformer does not change in proportion to changes in the primary current. One issue that can arise from saturation of a current transformer is damage to the current transformer.

Embodiments of this disclosure recognize that, when sensing current from a current transformer, there is an accuracy that often needs to be met. There is also a need to protect the current transformer from saturating during transients. In order to protect a current transformer from saturating, the voltage across a burden resistor often needs to be kept below a specified value. One way to limit the voltage across the burden resistor is by using a transient voltage suppression (TVS) device. However, TVS devices typically have large leakage currents, which decrease measurement accuracy.

This disclosure describes various techniques for current transformer sensing with saturation protection. As described in more detail below, a TVS device is configured to be coupled in parallel with a burden resistor, and a switch is configured to couple the TVS device across the burden resistor. A comparator is configured to detect a peak output voltage provided by a circuit (such as a current transformer), determine whether the peak output voltage meets or exceeds a threshold, and control the switch based on whether the peak output voltage meets or exceeds the threshold. Among other things, these techniques can help to minimize leakage current by "switching in" a clamp (the TVS device), which can help maintain high accuracy during non-saturation conditions while effectively providing protection during saturation conditions.

FIG. 1 illustrates an example system 100 supporting current transformer sensing with saturation protection according to this disclosure. The example of the system 100 shown in FIG. 1 is for illustration only. Other examples of the system 100 could be used without departing from the scope of this disclosure.

As shown in FIG. 1, the system 100 includes a current transformer 102 and a burden resistor 104. The current transformer 102 includes a primary coil on the left in FIG. 1 and a secondary coil on the right in FIG. 1. The primary coil receives a primary current, and electro-magnetic coupling creates a secondary current in the secondary coil. The secondary current is a replica of the primary current, although its magnitude can be scaled based on the ratio of the turns in the primary and secondary coils. The burden resistor 104 can be electrically coupled to the secondary coil of the current transformer 102 in order to generate a voltage based on the secondary current. As described below, this voltage can be used to determine whether the current transformer 102 is saturated. The burden resistor 104 can include any suitable resistance. In some cases, the burden resistor 104 can be relatively small.

The current transformer 102 is coupled to the burden resistor 104 in this example by a switched transient voltage suppression (TVS) device 106. The switched TVS device 106 can include a switch and a TVS device. The TVS device can be configured to be coupled in parallel across the burden resistor 104, and the switch can be used to selectively couple the TVS device across the burden resistor 104. The switch here can clamp the TVS device in parallel across the burden resistor 104 during saturation of the current transformer 102, which can help to protect the current transformer 102 from damage. The switch could have a very low leakage current, which can help to prevent the switched TVS device 106 from significantly impacting the measurement accuracy of the voltage across the burden resistor 104. In some cases, the switch can have a lower leakage current than the TVS device. Any suitable switch may be used in the switched TVS device 106, such as a CMOS or other transistor. Also, any suitable TVS device may be used in the switched TVS device 106, such as at least one capacitor, Zener diode, transient voltage suppressor diode, metal oxide varistor, or avalanche diode.

A differential sense circuit 108 is coupled across the burden resistor 104, and a comparator circuit 110 is coupled to the differential sense circuit 108 and the switched TVS device 106. The differential sense circuit 108 is used to sense the voltage generated across the burden resistor 104 by the current flowing through the secondary coil of the current transformer 102. For example, the differential sense circuit 108 can be used to detect the peak output voltage generated across the burden resistor 104 by the current transformer 102. The comparator circuit 110 can determine whether the peak output voltage meets or exceeds a threshold, such as a reference voltage or a threshold voltage based on the reference voltage. The comparator circuit 110 can also control whether the TVS device of the switched TVS device 106 is or is not coupled in parallel across the burden resistor 104 based on whether the peak output voltage meets or exceeds the threshold. For instance, the comparator circuit 110 could cause the switch of the switched TVS device 106 to connect the TVS device in parallel with the burden resistor 104 in response to the peak output voltage meeting or exceeding the threshold. The comparator circuit 110 could also cause the switch of the switched TVS device 106 to disconnect the TVS device from the burden resistor 104 in response to the peak output voltage being less than the threshold, thereby preventing the TVS device from affecting a measurement accuracy of the burden resistor 104. The differential sense circuit 108 includes any suitable structure configured to sense a peak or other voltage. The comparator circuit 110 includes any suitable structure configured to compare the peak or other voltage to another signal.

Although FIG. 1 illustrates one example of a system 100 supporting current transformer sensing with saturation protection, various changes may be made to FIG. 1. For example, various components in FIG. 1 may be combined, further subdivided, replicated, rearranged, or omitted and additional components could be added according to particular needs.

FIG. 2 illustrates a more specific example system 200 supporting current transformer sensing with saturation protection according to this disclosure. In particular, the system 200 represents one specific example implementation of the system 100 of FIG. 1 described above. The example of the system 200 shown in FIG. 2 is for illustration only. Other examples of the system 200 could be used without departing from the scope of this disclosure.

As shown in FIG. 2, the secondary coil of the current transformer 102 is coupled to the burden resistor 104 via the switched TVS device 106 and a resistor 202. The resistor 202 may have a resistance of about 0.01Ω, and the burden resistor 104 may have a resistance of about 33.3Ω. Note, however, that these resistances are for illustration and explanation only. The switched TVS device 106 in this example includes a switch 204 and a TVS device 206. One side of the TVS device 206 is coupled to the signal pathway coupling the secondary coil of the current transformer 102 to one side of the burden resistor 104. Another side of the TVS device 206 is coupled to the switch 204, which controls whether that side of the TVS device 206 is electrically coupled to the other side of the burden resistor 104. The switch 204 represents any suitable device configured to selectively form or break an electrical connection, such as an ADG5412 switching device from ANALOG DEVICES, INC. The TVS device 206 represents any suitable device configured to suppress electrical transients, such as an SMDJ90CA TVS diode from LITTLEFUSE, INC.

The differential sense circuit 108 in this example includes a resistor 208 coupled to one end of the burden resistor 104 and a resistor 210 coupled to another end of the burden resistor 104. Each resistor 208 and 210 can have any suitable resistance, such as a resistance of about 150 kΩ. A capacitor 212 and a resistor 214 are coupled in parallel with each other and to the resistor 208. The capacitor 212 can have any suitable capacitance, such as a capacitance of about 22 pF. The resistor 214 can have any suitable resistance, such as a resistance of about 20 kΩ. The capacitor 212 and the resistor 214 are coupled to a voltage source 216, such as a 1.5V source.

The resistor 208, capacitor 212, and resistor 214 are coupled to the non-inverting input terminal of an operational amplifier 218, and the resistor 210 is coupled to the inverting input terminal of the operational amplifier 218. The resistor 210 is also coupled to a capacitor 220 and a resistor 222, which are coupled in parallel with each other. The operational amplifier 218 can represent any suitable operational amplifier, such as an AD8513 operational amplifier from ANALOG DEVICES, INC. In some cases, a positive voltage supply terminal of the operational amplifier 218 can receive an input voltage from a voltage source 224, such an input voltage of about +15V. Also, a negative voltage supply terminal of the operational amplifier 218 can receive an input voltage from a voltage source 226, such an input voltage of about −15V. The capacitor 220 can have any suitable capacitance, such as a capacitance of about 22 pF. The resistor 222 can have any suitable resistance, such as a resistance of about 20 kΩ.

An output terminal of the operational amplifier 218, the capacitor 220, and the resistor 222 are coupled to a resistor 228. The resistor 228 is also coupled to a resistor 230. The resistor 230 is coupled to a capacitor 232, and the resistor 230 and the capacitor 232 are coupled to the non-inverting input terminal of an operational amplifier 234. The output terminal of the operational amplifier 234 is coupled to the inverting input terminal of the operational amplifier 234 and to a capacitor 236, which is also coupled between the resistors 228 and 230. The resistor 228 can have any suitable resistance, such as a resistance of about 30 kΩ. The resistor 230 can have any suitable resistance, such as a resistance of about 50 kΩ. The capacitor 232 can have any suitable capacitance, such as a capacitance of about 1000 pF. The operational amplifier 234 can represent any suitable operational amplifier, such as an AD8608 operational amplifier from ANALOG DEVICES, INC. In some cases, a positive voltage supply terminal of the operational amplifier 234 can receive an input voltage from a voltage source 238, such an input voltage of about +3.3V. Also, a negative voltage supply terminal of the operational amplifier 234 can be grounded. The capacitor 236 can have any suitable capacitance, such as a capacitance of about 2200 pF.

The differential sense circuit 108 here is used to generate a sense signal 240, which represents or includes a peak output voltage sensed across the burden resistor 104. The sense signal 240 is provided to the comparator circuit 110 and may optionally be output from the system 200. The comparator circuit 110 in this example includes a diode 242, which is configured to receive the sense signal 240 and limit current flow to one direction. A resistor 244 is coupled to the diode 242, a resistor 246 is coupled to the diode 242 and to one side of the resistor 244, and a capacitor 248 is coupled to the other side of the resistor 244. These components are used to sample the sense signal 240 and sample/hold the peak output voltage. The diode 242 includes any suitable structure configured to limit current flow to substantially a single direction, such as a 1N914 diode from ON SEMICONDUCTOR CORP. The resistor 244 can have any suitable resistance, such as a resistance of about 30 kΩ. The resistor 246 can have any suitable resistance, such as a resistance of about 1 kΩ. The capacitor 248 can have any suitable capacitance, such as a capacitance of about 0.1 μF.

A comparator 250 compares the sampled peak output voltage to a reference voltage, which may be provided by a voltage source 252. The output of the comparator 250 is used to control operation of the switch 204. Thus, the comparator 250 can selectively couple the TVS device 206 across the burden resistor 104 based on whether the sampled peak output voltage meets or exceeds the reference voltage. For instance, the switch 204 can be closed (conductive) when the sampled peak output voltage meets or exceeds the reference voltage, and the switch can be opened (non-conductive) when the sampled peak output voltage does not meet or exceed the reference voltage. The comparator 250 includes any suitable structure configured to compare electrical signals, such as an LT1716 comparator from ANALOG DEVICES, INC.

A resistor 254 can be coupled between the output of the comparator 250 and a supply voltage (such as a voltage from the voltage source 238). The supply voltage can be provided as a lower supply voltage to the switch 204, and the resistor 254 could help to pull down the output of the comparator 250 until the comparator 250 actively determines that the sampled peak output voltage meets or exceeds the reference voltage. The resistor 254 can have any suitable resistance, such as a resistance of about 5 kΩ.

Although FIG. 2 illustrates one more specific example of a system 200 supporting current transformer sensing with saturation protection, various changes may be made to FIG. 2. For example, various components in FIG. 2 may be combined, further subdivided, replicated, rearranged, or omitted and additional components could be added according to particular needs.

FIG. 3 illustrates an example method 300 for current transformer sensing with saturation protection according to this disclosure. For ease of explanation, the method 300 is described as being performed using the system 100 of FIG. 1 or the system 200 of FIG. 2. However, the method 300 may be performed using any other suitable device or system constructed in accordance with the teachings of this disclosure.

As shown in FIG. 3, a peak output voltage generated by a circuit is detected at step 302. This may include, for example, the differential sense circuit 108 detecting the peak output voltage generated across the burden resistor 104 by the current transformer 102. A determination is made whether the peak output volage meets or exceeds a threshold at step 304. This may include, for example, the comparator circuit 110 comparing the sense signal 240 or other peak output volage to a threshold voltage.

If the threshold is not met or exceeded at step 306, a TVS device is disconnected from the burden resistor (if connected) or remains disconnected from the burden resistor (if not connected) at step 308. This may include, for example, the switch 204 disconnecting (or maintaining disconnection of) the TVS device 206 from the burden resistor 104 or the switched TVS device 106 otherwise disconnecting (or maintaining disconnection of) a TVS device from the burden resistor 104. This allows the burden resistor to be used to monitor the current from the circuit at step 310. This may include, for example, an external component using the sense signal 240 or other signal to monitor operation of the current transformer 102.

If the threshold is met or exceeded at step 306, the TVS device is connected to the burden resistor (if disconnected) or remains connected to the burden resistor (if connected) at step 312. This may include, for example, the switch 204 connecting (or maintaining connection of) the TVS device 206 to the burden resistor 104 or the switched TVS device 106 otherwise connecting (or maintaining connection of) a TVS device to the burden resistor 104. This allows the TVS device to be used to limit the voltage across the burden resistor at step 314. This may include, for example, the TVS device 206 helping to prevent saturation of the current transformer 102 from causing damage.

Although FIG. 3 illustrates one example of a method 300 for current transformer sensing with saturation protection, various changes may be made to FIG. 3. For example, while shown as a series of steps, various steps in FIG. 3 could overlap, occur in parallel, occur in a different order, or occur multiple times (including zero times).

It may be advantageous to set forth definitions of certain words and phrases used throughout this patent document. The term "about" (when used with a numerical value)

indicates that the numerical value may vary by up to ±10%. The term “couple,” as well as derivatives thereof, include both direct and indirect coupling between two or more components. The terms “include” and “comprise,” as well as derivatives thereof, mean inclusion without limitation. The term “or” is inclusive, meaning and/or. The phrase “associated with,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase “at least one of,” when used with a list of items, means that different combinations of one or more of the listed items may be used, and only one item in the list may be needed. For example, “at least one of: A, B, and C” includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words “means for” or “step for” are explicitly used in the particular claim, followed by a participle phrase identifying a function. Use of terms such as (but not limited to) “mechanism,” “module,” “device,” “unit,” “component,” “element,” “member,” “apparatus,” “machine,” “system,” “processor,” or “controller” within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:

a transient voltage suppression (TVS) device;

a switch configured to electrically couple the TVS device in parallel across a burden resistor; and a comparator configured to:

detect a peak output voltage provided by a circuit;

determine whether the peak output voltage meets or exceeds a threshold; and control the switch based on whether the peak output voltage meets or exceeds the threshold.

2. The apparatus of claim 1, wherein the switch is configured to disconnect the TVS device from being electrically coupled in parallel across the burden resistor in response to the peak output voltage being less than the threshold, thereby preventing the TVS device from affecting a measurement accuracy of the burden resistor.

3. The apparatus of claim 1, further comprising:

a differential sense circuit configured to provide the peak output voltage to the comparator based on a voltage across the burden resistor.

4. The apparatus of claim 3, wherein the differential sense circuit comprises:

a voltage source;

a first operational amplifier coupled in parallel with the voltage source, a first resistor, and a first capacitor; and a second operational amplifier coupled in parallel with the voltage source, a second resistor, a second capacitor, and a third capacitor.

5. The apparatus of claim 1, wherein the TVS device is configured to limit voltage across the burden resistor in response to the switch being closed.

6. The apparatus of claim 1, wherein the switch has a lower leakage current than the TVS device.

7. The apparatus of claim 1, wherein the threshold is based on a reference voltage.

8. A system comprising:

a current transformer;

a burden resistor coupled to the current transformer;

a transient voltage suppression (TVS) device;

a switch configured to electrically couple the TVS device in parallel across the burden resistor; and a comparator configured to:

detect a peak output voltage provided by the current transformer;

determine whether the peak output voltage meets or exceeds a threshold; and control the switch based on whether the peak output voltage meets or exceeds the threshold.

9. The system of claim 8, wherein the switch is configured to disconnect the TVS device from being electrically coupled in parallel across the burden resistor in response to the peak output voltage being less than the threshold, thereby preventing the TVS device from affecting a measurement accuracy of the burden resistor.

10. The system of claim 8, further comprising:

a differential sense circuit configured to provide the peak output voltage to the comparator based on a voltage across the burden resistor.

11. The system of claim 10, wherein the differential sense circuit comprises:

a voltage source;

a first operational amplifier coupled in parallel with the voltage source, a first resistor, and a first capacitor; and a second operational amplifier coupled in parallel with the voltage source, a second resistor, a second capacitor, and a third capacitor.

12. The system of claim 8, wherein the TVS device is configured to limit voltage across the burden resistor in response to the switch being closed.

13. The system of claim 8, wherein the switch has a lower leakage current than the TVS device.

14. The system of claim 8, wherein the threshold is based on a reference voltage.

15. A method comprising:

detecting a peak output voltage provided by a circuit using a comparator;

determining whether the peak output voltage meets or exceeds a threshold using the comparator; and controlling a switch that selectively couples a transient voltage suppression (TVS) device electrically in parallel across a burden resistor based on whether the peak output voltage meets or exceeds the threshold using the comparator.

16. The method of claim 15, wherein the switch disconnects the TVS device from being electrically coupled in parallel across the burden resistor in response to the peak output voltage being less than the threshold, thereby preventing the TVS device from affecting a measurement accuracy of the burden resistor.

17. The method of claim 15, further comprising:

providing, by a differential sense circuit coupled across the burden resistor, the peak output voltage to the comparator.

18. The method of claim 17, wherein the differential sense circuit comprises:

a voltage source;

a first operational amplifier coupled in parallel with the voltage source, a first resistor and a first capacitor; and a second operational amplifier coupled in parallel with the voltage source, a second resistor, a second capacitor, and a third capacitor.

19. The method of claim 15, wherein the TVS device limits voltage across the burden resistor in response to the switch being closed.

20. The method of claim 15, wherein the switch has a lower leakage current than the TVS device.

* * * * *